United States Patent
Sivalingam et al.

(10) Patent No.: US 9,039,369 B2
(45) Date of Patent: *May 26, 2015

(54) WIND TURBINE NACELLE WITH COOLER TOP

(75) Inventors: Krishnamoorthi Sivalingam, Singapore (SG); Anand Bahuguni, Singapore (SG); Ravi Kandasamy, Singapore (SG); Srikanth Narasimalu, Singapore (SG); John K. Grevsen, Viby J (DK); Jesper Nyvad, Egå (DK); Paul T. Tietze, Brabrand (DK)

(73) Assignee: Vestas Wind Systems A/S, Aarhus N. (DK)

( * ) Notice: Subject to any disclaimer, the term of this patent is extended or adjusted under 35 U.S.C. 154(b) by 968 days.

This patent is subject to a terminal disclaimer.

(21) Appl. No.: 13/146,773

(22) PCT Filed: Jan. 29, 2010

(86) PCT No.: PCT/DK2010/050025
§ 371 (c)(1),
(2), (4) Date: Nov. 18, 2011

(87) PCT Pub. No.: WO2010/085963
PCT Pub. Date: Aug. 5, 2010

(65) Prior Publication Data
US 2012/0086215 A1    Apr. 12, 2012

Related U.S. Application Data

(60) Provisional application No. 61/148,537, filed on Jan. 30, 2009.

(30) Foreign Application Priority Data

Jan. 30, 2009    (DK) .................................. 2009 00150

(51) Int. Cl.
*F03D 11/00* (2006.01)

(52) U.S. Cl.
CPC ............. *F03D 11/00* (2013.01); *F05B 2260/20* (2013.01); *F05B 2260/64* (2013.01); *Y02E 10/722* (2013.01); *Y02E 10/726* (2013.01)

(58) Field of Classification Search
USPC ........................................................ 415/177
See application file for complete search history.

(56) References Cited

U.S. PATENT DOCUMENTS 6,903,466 B1    6/2005  Mercier et al.
2001/0035651 A1 11/2001 Umemoto et al.
(Continued)

FOREIGN PATENT DOCUMENTS

DE    30 10 485    9/1981
DE    102 33 947   2/2004
(Continued)

OTHER PUBLICATIONS

International Preliminary Report on Patentability (Chapter I of the Patent Cooperation Treaty); The International Bureau of WIPO, PCT/DK2010/050023, Aug. 2, 2011, 6 pgs.
(Continued)

*Primary Examiner* — Richard Edgar
(74) *Attorney, Agent, or Firm* — Wood, Herron & Evans, LLP

(57) ABSTRACT

The present invention relates to a wind turbine nacelle having a top face with a longitudinal extension in a wind direction, comprising a cooling device extending from the top face of the nacelle and a cover having at least one inner face. The cooling device is enclosed by the top face of the nacelle and the inner face of the cover.

18 Claims, 8 Drawing Sheets

(56) References Cited

U.S. PATENT DOCUMENTS

2006/0113804 A1    6/2006    Costin
2008/0247875 A1   10/2008    Yoshida
2010/0061853 A1*   3/2010    Bagepalli ..................... 416/95

FOREIGN PATENT DOCUMENTS

| DE | 103 51 844   | 6/2005  |
|----|--------------|---------|
| EP | 1 081 376    | 3/2001  |
| EP | 1 586 769    | 10/2005 |
| EP | 1 612 415    | 1/2006  |
| GB | 203 307      | 9/1924  |
| JP | 2005-83659   | 3/2005  |
| JP | 2008-247325  | 10/2008 |
| WO | 2008/131766  | 11/2008 |
| WO | 2009/033925  | 3/2009  |
| WO | 2009/115100  | 9/2009  |

OTHER PUBLICATIONS

International Preliminary Report on Patentability (Chapter I of the Patent Cooperation Treaty); The International Bureau of WIPO, PCT/DK2010/050022, Aug. 2, 2011, 6 pgs.

International Preliminary Report on Patentability (Chapter I of the Patent Cooperation Treaty); The International Bureau of WIPO, PCT/DK2010/050024, Aug. 2, 2011, 7 pgs.

International Preliminary Report on Patentability (Chapter I of the Patent Cooperation Treaty); The International Bureau of WIPO, PCT/DK2010/050025, Aug. 2, 2011, 6 pgs.

Sven Nytoft Rasmussen, Ph.D.; 1st Technical Examination and Search Report issued in related Denmark Application No. PA 2009 00149; Sep. 15, 2009; 4 pages; Denmark Patent and Trademark Office.

Ulrich Gebker; International Search Report and Written Opinion issued in related International Application No. PCT/DK2010/05022; Feb. 3, 2011; 10 pages; European Patent Office.

Carsten Nielsen; 1st Technical Examination and Search Report issued in related Denmark Application No. PA 2009 00151; Sep. 14, 2009; 5 page; Denmark Patent and Trademark Office.

Ulrich Gebker; International Search Report and Written Opinion issued in related International Application No. PCT/DK2010/05023; Feb. 3, 2011; 10 pages; European Patent Office.

Sven Nytoft Rasmussen, Ph.D.; 1st Technical Examination and Search Report issued in related Denmark Application No. PA 2009 00148; Sep. 15, 2009; 4 pages; Denmark Patent and Trademark Office.

Ulrich Gebker; International Search Report and Written Opinion issued in related International Application No. PCT/DK2010/050024; Feb. 11, 2011; 11 pages; European Patent Office.

Carsten Nielsen; 1st Technical Examination and Search Report issued in priority Denmark Application No. PA 2009 00150; Sep. 3, 2009; 4 pages; Denmark Patent and Trademark Office.

Ulrich Gebker; International Search Report and Written Opinion issued in priority International Application No. PCT/DK2010/050025; Feb. 3, 2011; 10 pages; European Patent Office.

* cited by examiner

WIND TURBINE NACELLE WITH COOLER TOP

FIELD OF THE INVENTION

The present invention relates to a wind turbine nacelle having a top face with a longitudinal extension in a wind direction, comprising a cooling device extending from the top face of the nacelle and a cover having at least one inner face, the cooling device being enclosed by the top face of the nacelle and the inner face of the cover.

BACKGROUND ART

A wind turbine converts wind power into electrical energy by using a generator placed among other equipment in the nacelle of the wind turbine. When the generator converts energy, the air surrounding the equipment is heated and the equipment itself is thus heated, too.

When the equipment is heated, the efficiency with which the conversion occurs is substantially decreased. In order to cool the equipment, the heated air surrounding the equipment is vented, allowing cooler air from the outside to enter the wind turbine nacelle and cool the equipment.

For this purpose, a cooling device is placed on top of the nacelle for venting of heated air comprised inside the nacelle. However, placing a cooling device on top of the nacelle means that the rear part of the nacelle and the rear side of the cooling device can only be entered using a crane.

SUMMARY OF THE INVENTION

It is an object of the present invention to wholly or partly overcome the above disadvantages and drawbacks of the prior art. More specifically, it is an object to provide an improved wind turbine nacelle where access from one side of a cooling device to another side is made easier than in the solutions of prior art.

The above objects, together with numerous other objects, advantages, and features, which will become evident from the below description, are accomplished by a solution in accordance with the present invention by a wind turbine nacelle having a top face with a longitudinal extension in a wind direction, comprising:
 a cooling device extending from the top face of the nacelle, and
 a cover having at least one inner face,
the cooling device being enclosed by the top face of the nacelle and the inner face of the cover,
wherein at least a part of the cooling device is movable, allowing access through the cooling device.

A wind turbine nacelle is designed as small as possible in order to keep the weight of the nacelle low. Equipment placed in a separate compartment in the back part of the nacelle cannot be accessed from within the nacelle, and when serviced is needed access has to be gained otherwise.

When at least a part of the cooling device is movable, the cooling device no longer has to be dismounted nor is a crane needed, since access to the rear part of the wind turbine nacelle can be gained though the cooling device. Thus, the equipment in a separate part of the back of the wind turbine nacelle can be serviced or the cooling area can be cleaned.

A further advantage of enclosing the cooling device within the cover is thus that the cover may provide the wind turbine nacelle with a recognisable design, which may be used to identify the manufacturer of the wind turbine.

In one embodiment, the cooling device may have a first face which is pivotably connected to the cover.

Thus, the whole cooling device can be pivoted in order to get access to the rear part of the wind turbine nacelle or to the back of the cooling device.

In addition, the nacelle may have a width across the longitudinal extension of the nacelle and the cooling device may have a length across the longitudinal extension of the wind turbine nacelle, the length of the cooling device being at least 60% of the width of the nacelle, preferably at least 70% of the nacelle, more preferably at least 80%, and even more preferably at least 90% of the width of the nacelle.

In one embodiment, the first face may be a top face of the cooling device, which top face is the face of the cooling device furthest away from the top face of the nacelle.

In another embodiment, the first face may be a first side face of the cooling device.

In yet another embodiment, the first face may be a bottom face of the cooling device, which bottom face is the face of the cooling device closest to the top face of the nacelle.

Also, the cooling device may have a second side face opposite the first side face, the first and second side faces being pivotably connected to the cover so that access can be gained by pivoting the cooling device. The pivoting may be between 0-180°.

A cooling device used on top of a wind turbine nacelle is very big and therefore heavy, and it is impossible for one service person to move it without having aiding equipment or a crane. When having a two opposing side faces of the cooling device pivotably connected to the cover, only a part of the cooling device, and thus only a part of the weight of the cooling device, has to be moved. Hereby, one service person can perform the service or the cleaning without any crane or additional equipment.

Also, the cooling device may have a centre of gravity and may be connected with another part of the cooling device, the cover, or the top face of the nacelle in its centre of gravity.

In another embodiment, the movable part may be a first part of the cooling device which is slidable in relation to a second part of the cooling device so that the first part is able to partly overlap the second part.

When having a first part which is slidable in relation to a second part of the cooling device, one service person can perform the service or the cleaning without any crane or additional equipment.

In yet another embodiment, the movable part may be a door or a hatch pivotably connected to the cooling device or the cover.

Having a door or a hatch pivotably connected to the cooling device or the cover also enables one service person to perform the service or the cleaning without any crane or additional equipment.

In addition, the cooling device may be connected with another part of the cooling device, the cover, or the top face of the nacelle in at least one connection having motion damping means using hydraulic, pneumatic, rubber, or a spring means to control the movement of the cooling device.

It is thus prevented that the weight of the heavy cooling device falls down on the service person, and the cooling device can thus be moved by one service person without additional safety equipment.

Furthermore, at least one part of the cover may be movable in relation to another part of the cover, the cooling device, or the top face of the nacelle.

Also, the nacelle may further comprise a plurality of cooling devices arranged with a mutual distance.

Furthermore, the distance between two cooling devices may be between 20 and 200 mm, preferably between 50 and 150 mm, and even more preferably between 80 and 120 mm.

In one embodiment, one cooling device may be connected to one cooling circuit, and another cooling device may be connected to another cooling circuit.

In addition, the cooling circuits may be arranged so that they cool different components in the nacelle, for instance components in the drive train, such as the gearbox.

In another embodiment, one cooling device may be slidable in relation to another cooling device.

Furthermore, a hinge connection may be arranged between at least two cooling devices. The hinge connection may be arranged at a top and at a bottom of the cooling devices.

Also, the hinge connection may comprise at least two corrugated metal pipes, the corrugated metal pipes being connected to and extending between the cooling devices, and the corrugated metal pipes preferably being made of stainless steel. In this way, a reliable and steady hinge connection is obtained which may both compensate for dynamic loads and enable one cooling device to be opened if passage through the cooling device is desirable.

The invention may further relate to a wind turbine nacelle having a top face with a longitudinal extension in a wind direction, comprising:
   a cooling device extending from the top face of the nacelle, and
   a cover having at least one inner face,
the cooling device being enclosed by the top face of the nacelle and the inner face of the cover,
wherein at least one part of the cover is movable in relation to another part of the cover, the cooling device, or the top face of the nacelle.

In one embodiment, the movable part of the cover may be a hatch in the top of the cover.

In another embodiment, the entire cover may be movable, the entire cover thus constituting the movable part of the cover, the cover being pivotably connected to the nacelle.

Finally, the invention also relates to a wind turbine comprising a wind turbine nacelle according to any of the preceding claims.

BRIEF DESCRIPTION OF THE DRAWINGS

The invention and its many advantages will be described in more detail below with reference to the accompanying schematic drawings, which for the purpose of illustration show some non-limiting embodiments and in which.

All the figures are highly schematic and not necessarily to scale, and they show only those parts which are necessary in order to elucidate the invention, other parts being omitted or merely suggested.

DETAILED DESCRIPTION OF THE INVENTION

A wind turbine nacelle 1 is situated on a tower and has a front facing a hub in which a plurality of rotor blades, normally three blades, is fastened. The wind turbine nacelle 1 houses a generator and other equipment used for driving the conversion process of wind energy to electricity—also called the drive train. When producing electricity, the drive train produces a lot of heat, resulting in a less effective conversion process.

In order to cool the equipment and other parts of the nacelle, a cooling device 3 is arranged outside the nacelle 1. Wind flowing along a longitudinal extension of the nacelle 1 flows in through at least one cooling area 4 of the cooling device 3 and cools a fluid within the cooling device 3. The cooled fluid exchanges heat with the parts of the nacelle 1 or equipment to be cooled.

The present invention will mainly be described in connection with an upwind wind turbine, i.e. a wind turbine where the nacelle is placed downwind from the wind turbine blades. However, the invention may as well advantageously be implemented in a downwind wind turbine, i.e. a wind turbine where the nacelle is placed upwind from the wind turbine blades.

Figure 1:
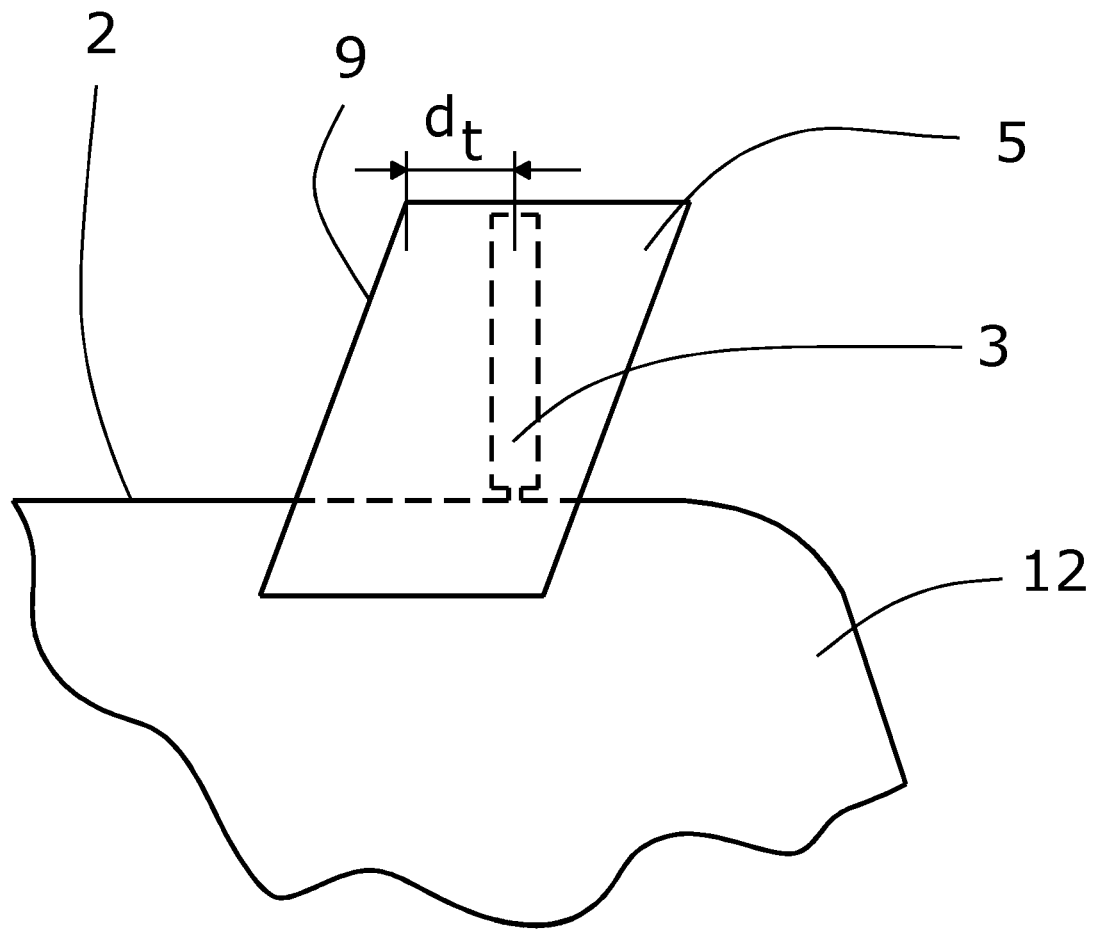
FIG. 1 shows a wind turbine nacelle having a cooling device according to the present invention.

FIG. 1 shows a partial view of the wind turbine nacelle 1 having a top face 2 on which a cooling device 3 is arranged. The wind turbine nacelle 1 has an elongated extension from the rotor blades to the rear end 12 of the nacelle. The cooling device 3 is surrounded by a cover 5 extending from a top part of the nacelle 1. As can be seen, the cooling device 3 projects substantially perpendicular from the top face 2 of the nacelle 1. However, in another embodiment, the cooling device 3 may extend from the top face 2 of the nacelle in an angle different from 90° in order to provide a more optimal cooling.

In this embodiment, one part of the cooling device 3 is movable in relation to another part of the cooling device, the top face of the wind turbine nacelle 1, or the inner face of the cover 5. When at least a part of the cooling device 3 is movable, access to the rear part 12 of the wind turbine nacelle 1 can be gained by moving that part and pass the cooling device under the cover 5. When a cooling device 3 take up at least 60% of the width w of the wind turbine nacelle 1 so that the length l of the cooling device is 60% of the nacelle width w, a service person can no longer walk past the cooling device on top of the wind turbine nacelle.

Figure 2:
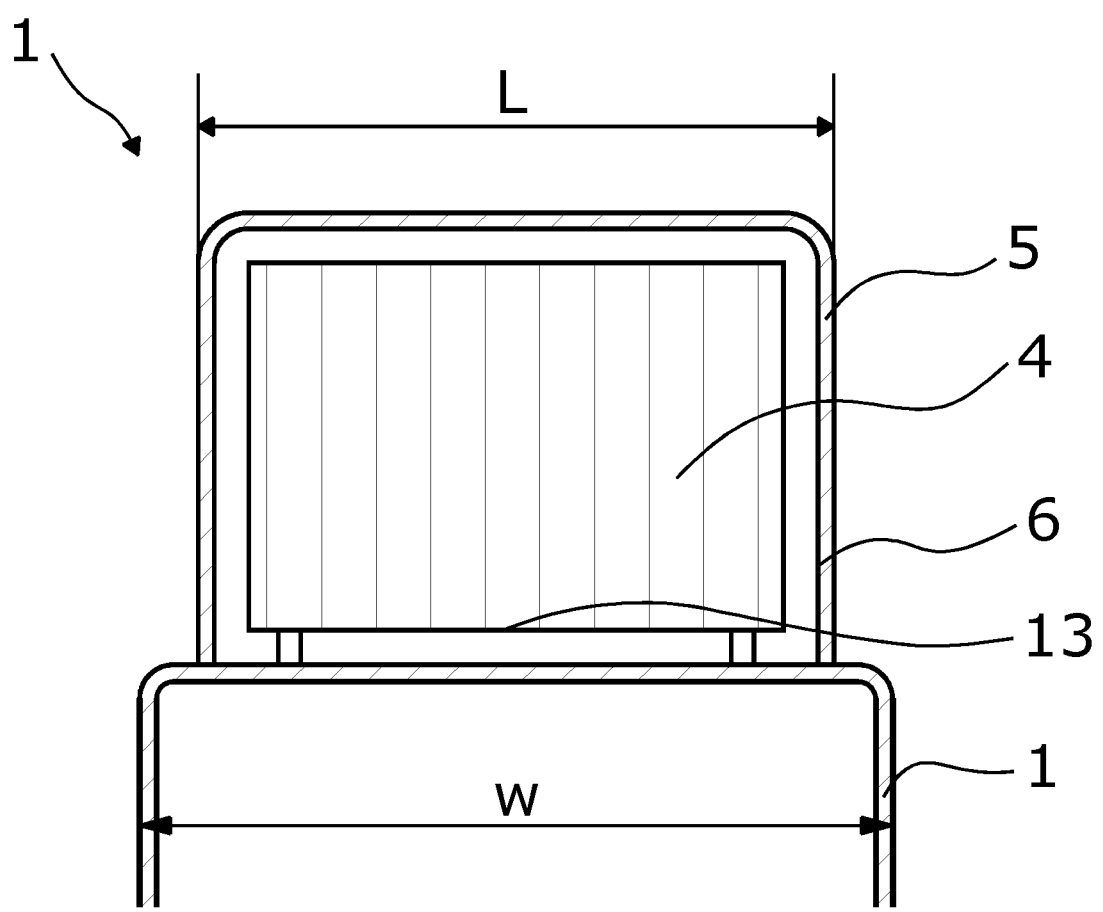
FIG. 2 shows a partly cross-sectional view of the nacelle of FIG. 1.

The cover 5 is shown extending from the top part of the wind turbine nacelle 1 so that a front edge 9 of the cover 5 has an angle of 5-45° from a direction perpendicular to the top face 2 of the nacelle. In another embodiment, the cover 5 extends from the top face 2 of the nacelle 1 as shown in FIG. 2. The cover 5 may have any kind of shape enclosing the cooling device 3 of the wind turbine nacelle 1.

The cooling device 3 of FIG. 2 has a first face, i.e. the bottom face 13 of the cooling device, which face is connected to the top face 2 of the wind turbine nacelle 1 in two flexible connections 11 so that the cooling device can be lowered from a position perpendicular to the top face 2 of the nacelle to a position parallel to the top face of the nacelle.

When the cooling device 3 is moved into a position parallel to the top face 2 of the nacelle 1, the cooling device lies on the top face of the wind turbine nacelle and access to the rear part 12 of the nacelle can be gained by walking on the cooling device and thus through the cover 5.

Figure 4:
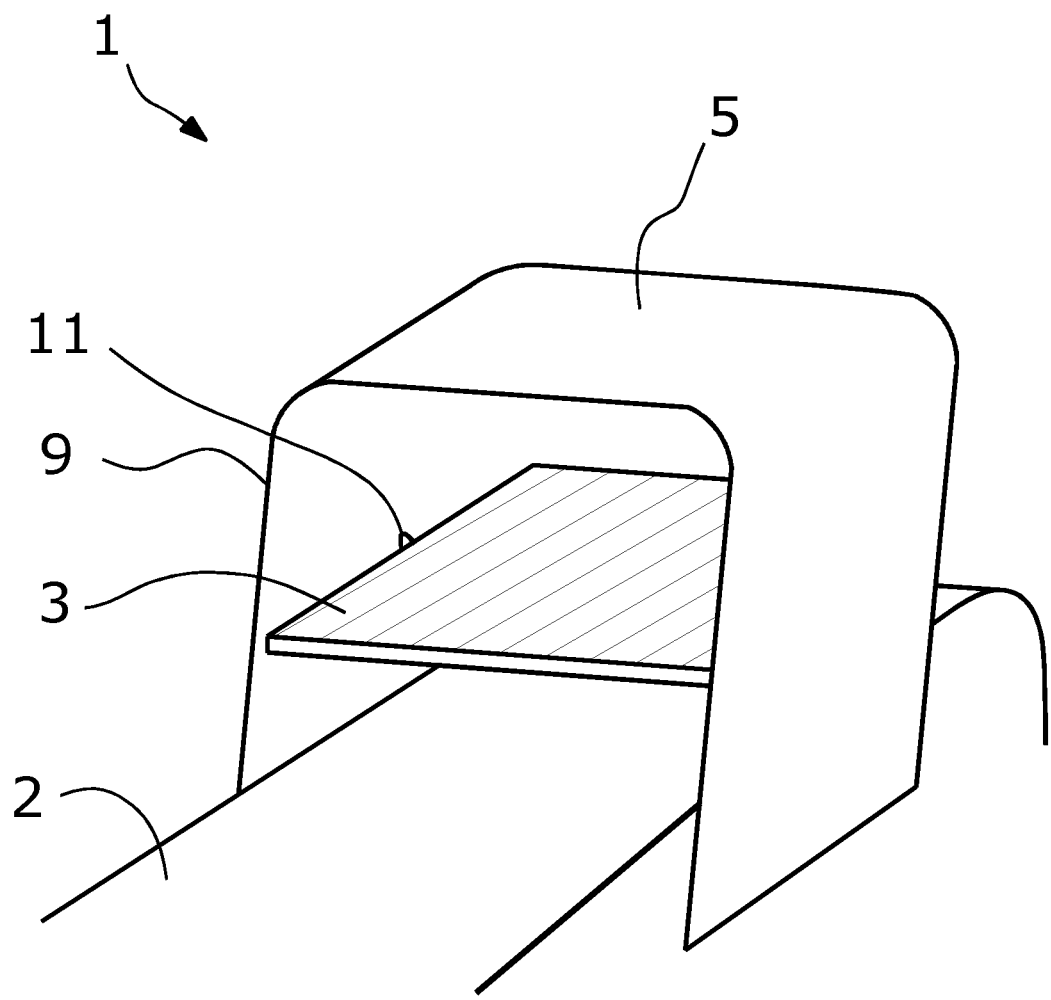
FIG. 4 shows a view of another embodiment of the nacelle in perspective.

In another embodiment, the cooling device 3 is pivotably connected to the cover 5 at its side faces, and access to the rear part 12 of the wind turbine nacelle 1 is gained by pivoting the cooling device, e.g. as shown in FIG. 4. In this embodiment, the cooling fluid either passes through these pivotable connections or the fluid connections between the bottom face 13 of the cooling device 3 and the top face 2 of the nacelle 1 is disconnected.

Figure 5:
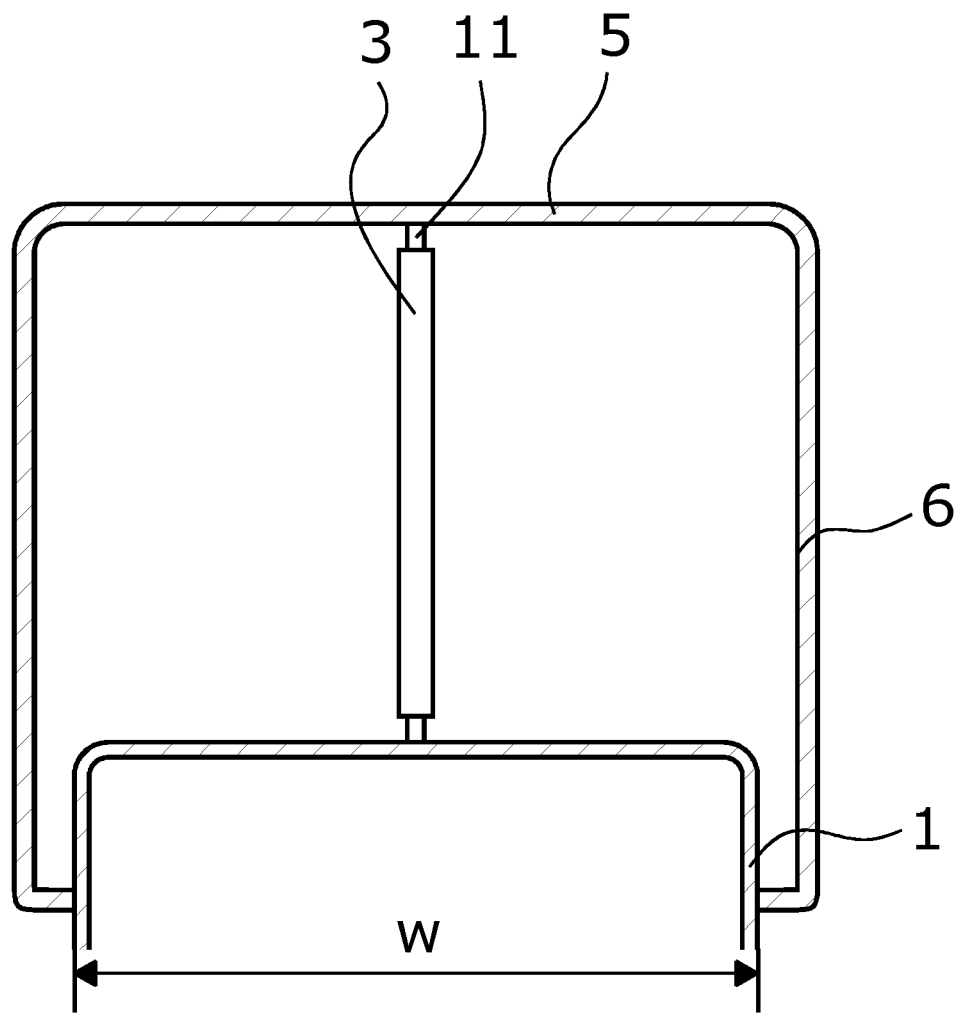
FIG. 5 shows a partly cross-sectional view of yet another embodiment of the nacelle according to the invention.

As shown in FIG. 5, the cooling device 3 has a first face, in this case a top face, which face is pivotably connected to an inner top face of the cover 5 while a second face of the cooling device opposite the first face is pivotably connected to the top face 2 of the wind turbine nacelle 1. Thus, access to the rear part 12 of the nacelle 1 can be obtained by turning the cooling device 3 from a position perpendicular to longitudinal extension of the nacelle to a position parallel to the longitudinal extension of the nacelle.

Figure 6:
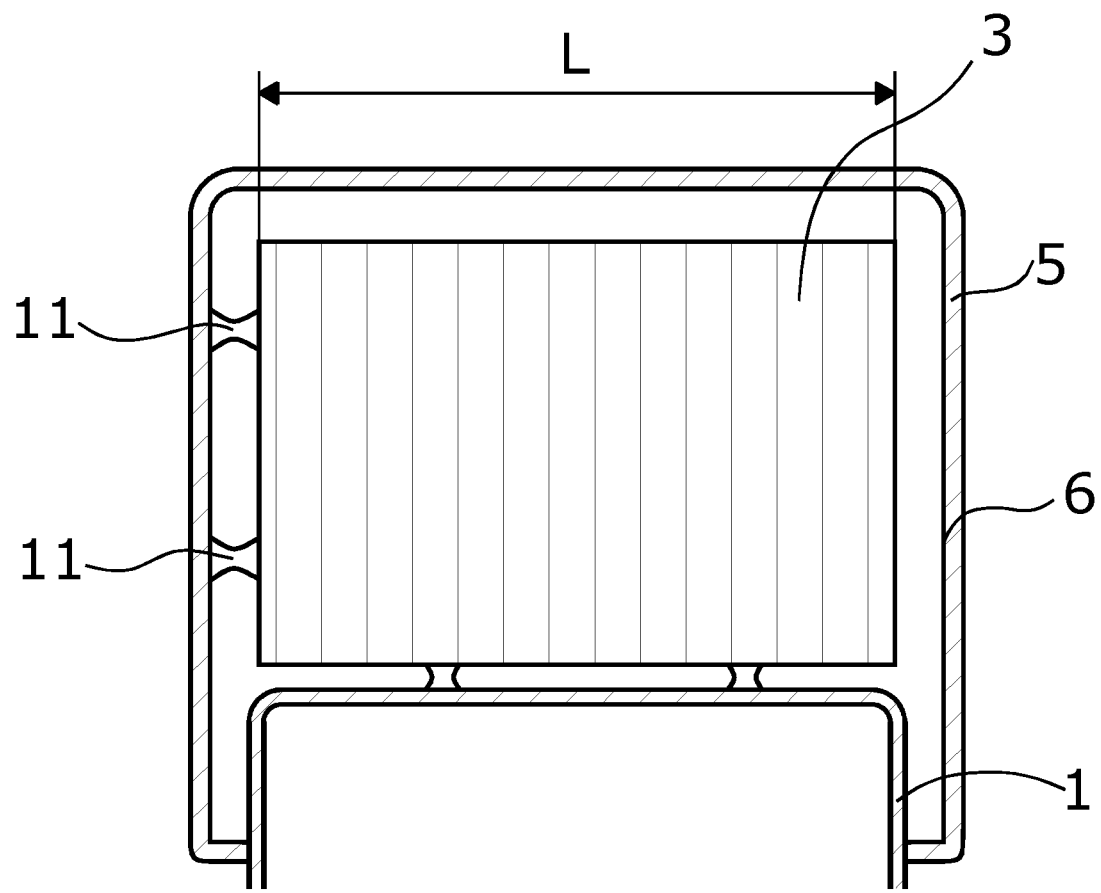
FIG. 6 shows a partly cross-sectional view of yet another embodiment of the nacelle.

In one embodiment, the cooling device 3 is connected to the cover 5 at a side face and the bottom face 13 of the cooling device as shown in FIG. 6. In order to get access the rear part 12 of the nacelle 1, the connections between the bottom part 13 of the cooling device and the top face 2 of wind turbine nacelle is disconnected. In another embodiment, the cooling fluid runs through the pivotable connections 11 in the side of the cooling device 3, and the cooling fluid thus does not have to be disconnected in order to turn or pivot the cooling device.

Figure 7:
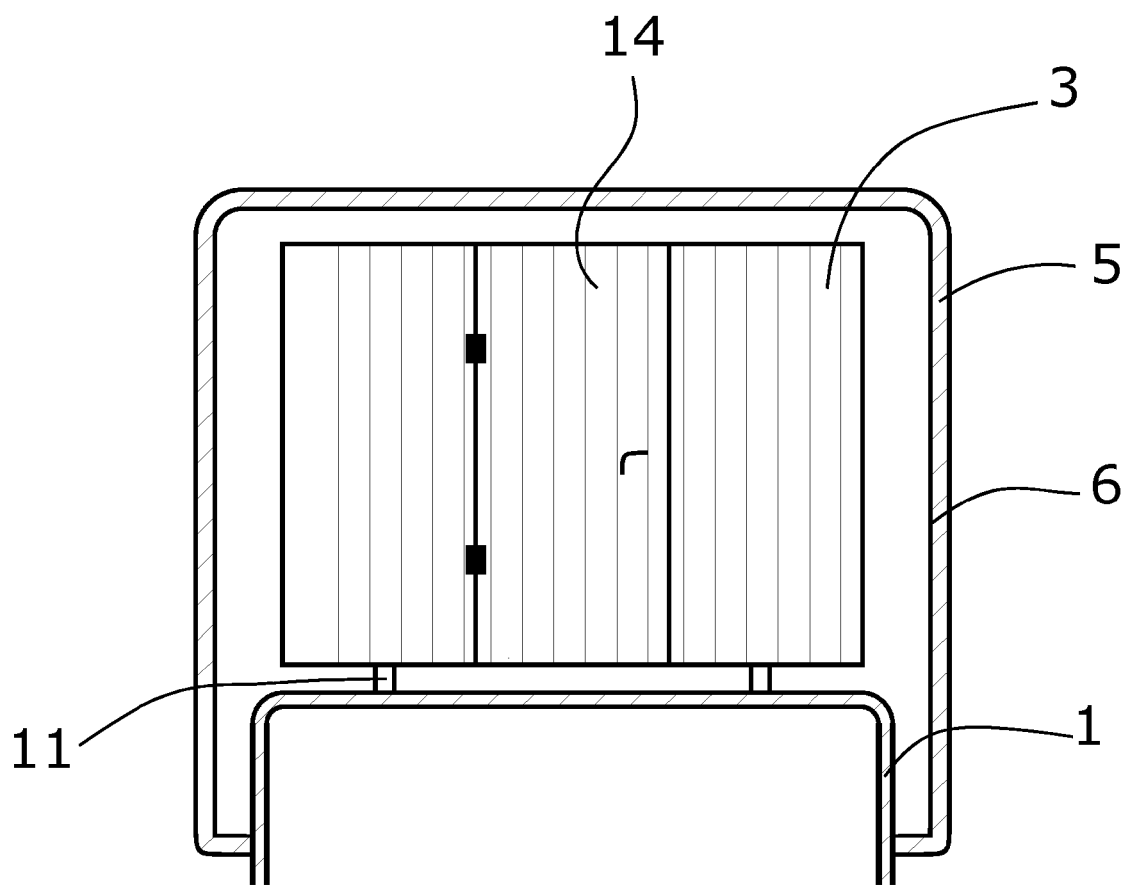
FIG. 7 shows a partly cross-sectional view of the nacelle having a door.

In FIG. 7, the cooling device 3 is shown having a door 14 which is pivotably connected to the cooling area 4. Access to the rear part 12 of the wind turbine nacelle 1 is gained by opening the door 14. In this embodiment, the door 14 constitutes part of the cooling area. The door 14 is positioned in the middle of the cooling area 4; however, in another embodiment, the door may be arranged in the side of the cooling area.

In another embodiment, the movable part of the cooling device 3 is a hatch which is pivotably connected to another part of the cooling device or the cover. When opening the hatch, a service person may get access to the rear part 12 of the wind turbine nacelle 1, and equipment, such a transformer, positioned in the rear part of the nacelle may be serviced.

Figure 3:
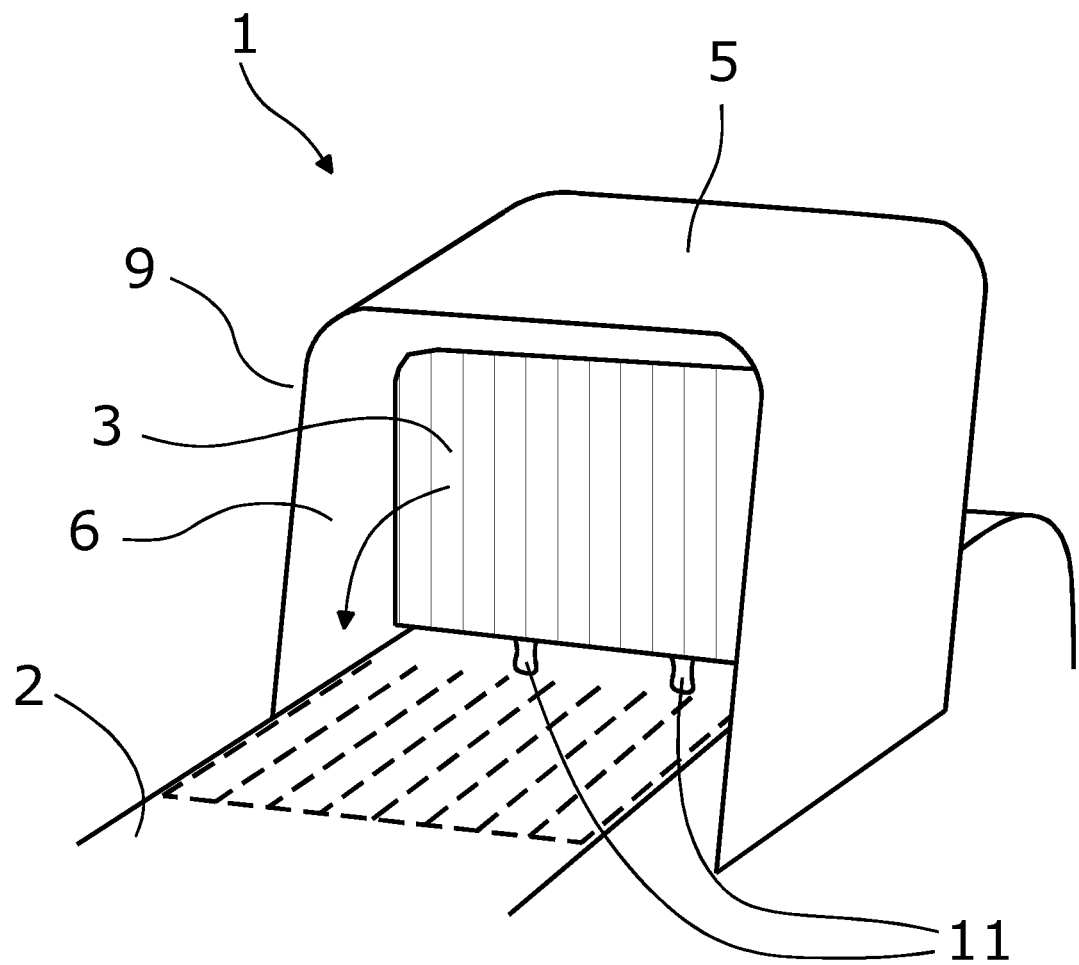
FIG. 3 shows a view of the nacelle of FIG. 2 in perspective.

By pivoting the whole cooling device 3 all the way around as shown in FIGS. 3-5, the back side of the cooling device can also be cleaned. Access to the rear side of the cooling device 3 can also be gained in order to clean the cooling device by moving part of or the whole cooling device as shown in FIGS. 3, 6, and 7.

Figure 8:
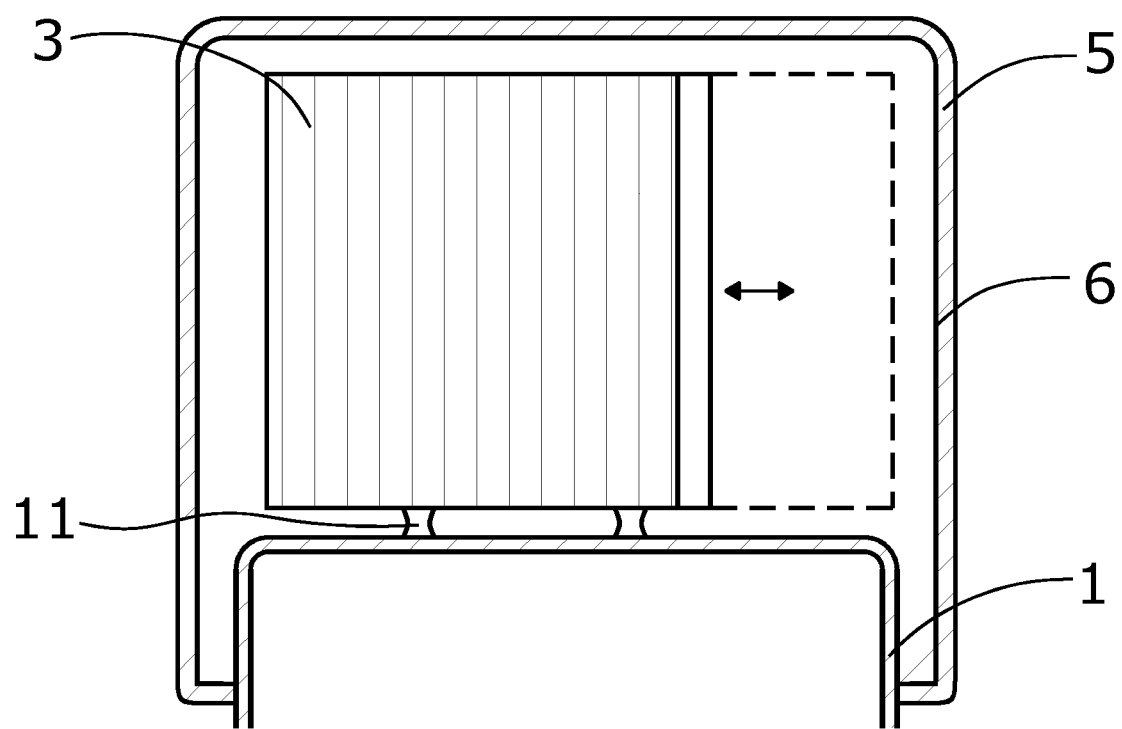
FIG. 8 shows a partly cross-sectional view of the nacelle having a slidable part.

Access to the rear part of the wind turbine nacelle may also be gained by having a first part of the cooling device which is slidably connected to a second part of the cooling device. When access is needed, the first part is slid sideways to overlap the second part as shown in FIG. 8.

In another embodiment, the second part is slid upwards or downwards to overlap the first part of the cooling device 3 in order to gain access to the rear part 12 of the wind turbine nacelle 1.

As shown in FIGS. 4 and 5, the cooling device 3 may be connected to the cover 5 and the top face 2 of the wind turbine nacelle 1 in its centre of gravity. Hereby, moving of the cooling device 3 is much easier since only the friction need to be overcome for turning the cooling device. Furthermore, the connection of the cooling device to either the top face and/or the cover may be displaced in view of the centre of gravity of the cooling device.

The above-mentioned cooling device 3 may be any kind of cooler, heat sink, or heat exchanger where a first fluid, such as the wind, cools a second fluid, such as a coolant, a refrigerant, or the like fluid. In a preferred embodiment, the cooling device 3 is a free wind cooler, i.e. a heat sink through which the wind surrounding the cooling area 4 passes freely and in that way cools the fluid flowing within the tubing of the cooling device.

According to the invention, the cooling device 3 may have an additional cooling part between the side of the wind turbine nacelle 1 and the inner face 6 of the cover 5. The additional cooling part may be integrated with the first cooling area 4 to form one cooling circuit or be a separate part which can be turned on when additional cooling is needed.

The nacelle may also comprise a plurality of cooling devices arranged side by side to form one cooling surface. The cooling devices may be connected to the cooling system as a series or parallel circuit. One cooling device may be connected to one cooling circuit cooling some elements in the drive train, and another cooling device may be connected to another cooling circuit cooling another section of elements in the drive train. The cooling devices may be connected by means of valves which can fluidly disconnect two cooling devices so that they form part of two separate cooling circuits whereby they can cool separate elements or sections in the nacelle.

The cooling devices may also be arranged with a mutual distance creating a space between them so that wind can flow between two cooling devices in this space. The distance between two cooling devices may be between 20 and 200 mm, preferably between 50 and 150 mm, and even more preferably between 80 and 120 mm.

The cooling devices may be slidable in relation to each other so as to provide access to the rear part of the nacelle behind the cooling device.

Furthermore, a hinge connection may be arranged between at least two cooling devices. The hinge connection may for instance be arranged at a top and at a bottom of the cooling devices.

In an embodiment according to the invention, an air gap is arranged between two adjacent cooling devices, and in relation to this embodiment, the hinge connection between the two cooling devices may comprise at least two corrugated metal pipes, the corrugated metal pipes being connected to and extending between the cooling devices, for instance at their top and bottom. By implementing a corrugated metal pipe as the hinge connection, it is obtained that the pipe may easily be bent in any direction, and one cooling device may thereby be displaced and moved in relation to the other cooling device, creating a passage is created from the upwind side of the cooling devices to the downwind side, or vice versa. Furthermore, a rod may be arranged along the corrugated pipe. The first end of the rod is connected to the cooling device which may be moved. The second end stops at a predetermined distance from the adjacent cooling device, meaning that the second end of the rod defines the point of rotation of the hinge. Within the inventive idea, the hinge connection may only comprise one corrugated metal pipe and one rod, however, if two or more corrugated metal pipes are arranged between adjacent cooling devices, each pipe or only selected pipes may also comprise a rod extending along them.

Advantageously, the corrugated metal pipes are preferably made of stainless steel, meaning that the lifetime of the hinge connection is prolonged and that the hinge connection is not deteriorated by the environment, such as by UV radiation, etc.

Furthermore, the corrugated metal pipes may also absorb potential misalignment and different production tolerances of the cooling devices.

In addition, rails may be arranged at the cover and at the first face of the nacelle, which may guide the cooling device when it is being moved.

For the purpose of illustration, the form of the nacelle 1 has merely been sketched. In reality, the nacelle is usually highly aerodynamic in shape and may have rounded corners instead of appearing as a square box. Furthermore, the sides of the nacelle may be concave or convex. Even though the wind turbine nacelle 1 is shown as being on a horizontal line, the nacelle is rarely perpendicular to the centre axis of the tower, but often has an angle in relation to a horizontal line.

Furthermore, the cover 5 may have any kind of shape. Even though the cover 5 is primarily shown as having a partly square cross-section with rounded corners, the cover may have more than three sides, e.g. seven sides. The cover 5 is shown as extending from a top part or a top face 2 of the wind turbine nacelle 1, but it may also extend from a bottom part of the nacelle or even encircle the nacelle.

In the rear part 12 of the wind turbine nacelle 1, a transformer may be arranged and, if the transformer or generator needs replacement or comprehensive fixing, the transformer has to taken out by means of a crane. When the cooling device 3 is enclosed by a cover 5, it is difficult to take out the transformer without dismounting the cover. In order to take out the transformer, at least one part of the cover 5 may be movable in relation to another part of the cover, the cooling device 3, or the top face 2 of the nacelle 1. Hereby, it is possible to remove the transformer by means of a crane.

Furthermore, the movable part of the cover 5 may be a hatch in the top of the cover. The hatch has the size of the element which has to be removed, such as a transformer.

In addition, the entire cover 5 may be movable, the entire cover thus constituting the movable part of the cover. The cover 5 may be pivotably connected to the nacelle 1. Access to e.g. the transformer is thus gained by pivoting the cover 5 forward or backward so that the cover lies along the top face 2 of the nacelle 1. In its simple form, the cover 5 is a bend plate so that the front edge of the cover abuts the top face 2 of the wind turbine nacelle 1.

Furthermore, the movable part of the cover 5 may be a removable top part, e.g. the roof part of the cover, or the roof part may be pivotably connected to the side parts of the cover, e.g. at the middle or at the front edge.

In order to gain access to e.g. a transformer in the rear part 12 of the wind turbine nacelle 1, the cover 5 may have a hatch which is opened for removing the transformer or other parts in the rear of the wind turbine nacelle.

Furthermore, during transportation of the nacelle to the site where it is to be installed, the cover may be transported separately from the nacelle. However, the nacelle and the cover may also be transported together. Where this is the case, the cover may either be displaced downwards towards the nacelle (the sides of the cover extending on the outside of the nacelle), or it may comprise some kind of hinge means enabling it to be turned either towards the end of the nacelle or towards the front. In this way, the overall height of the nacelle and cover is minimised so that it may be transported on public roads.

By wind turbine is meant any kind of apparatus able to convert wind power into electricity such as a wind generator, wind power unit (WPU), or wind energy converter (WEC).

Although the invention has been described in the above in connection with preferred embodiments of the invention, it will be evident for a person skilled in the art that several modifications are conceivable without departing from the invention as defined by the following claims.

The invention claimed is:

1. A wind turbine nacelle having a top exterior face with a longitudinal extension in a wind direction, comprising:
    a cooling device extending outwardly from the top face of the nacelle and being directly exposed to ambient wind flow, and
    a cover having at least one inner face, the cooling device being enclosed by the top face of the nacelle and the inner face of the cover,
    wherein at least one part of the cooling device is movable in relation to another part of the cooling device, the cover, or the top face of the nacelle.

2. The wind turbine nacelle according to claim 1, further comprising a plurality of cooling devices arranged with a mutual distance, and the distance between two cooling device is between 20 and 200 mm.

3. A wind turbine comprising a wind turbine nacelle according to claim 1.

4. A wind turbine nacelle having a top face with a longitudinal extension in a wind direction, comprising:
    a cooling device extending from the top face of the nacelle, and
    a cover having at least one inner face, the cooling device being enclosed by the top face of the nacelle and the inner face of the cover,
    wherein at least one part of the cooling device is movable in relation to another part of the cooling device, the cover, or the top face of the nacelle,
    wherein the cooling device has a first face which is pivotably connected to the cover.

5. The wind turbine nacelle according to claim 4, wherein the first face is a top face of the cooling device, which top face is the face of the cooling device furthest away from the top face of the nacelle.

6. The wind turbine nacelle according to claim 4, wherein the first face is a first side face of the cooling device.

7. The wind turbine nacelle according to claim 6, wherein the cooling device has a second side face opposite the first side face, the first and second side faces being pivotably connected to the cover so that access can be gained by pivoting the cooling device.

8. The wind turbine nacelle according to claim 4, wherein the first face is a bottom face of the cooling device, which bottom face is the face of the cooling device closest to the top face of the nacelle.

9. A wind turbine nacelle having a top face with a longitudinal extension in a wind direction, comprising:
    a cooling device extending from the top face of the nacelle, and
    a cover having at least one inner face, the cooling device being enclosed by the top face of the nacelle and the inner face of the cover,
    wherein at least one part of the cooling device is movable in relation to another part of the cooling device, the cover, or the top face of the nacelle,
    wherein the cooling device has a centre of gravity and is connected with another part of the cooling device, the cover, or the top face of the nacelle in its centre of gravity.

10. A wind turbine nacelle having a top face with a longitudinal extension in a wind direction, comprising:
    a cooling device extending from the top face of the nacelle, and
    a cover having at least one inner face, the cooling device being enclosed by the top face of the nacelle and the inner face of the cover,
    wherein at least one part of the cooling device is movable in relation to another part of the cooling device, the cover, or the top face of the nacelle,
    wherein the movable part is a first part of the cooling device which is slidable in relation to a second part of the cooling device so that the first part is able to partly overlap the second part.

11. A wind turbine nacelle having a top face with a longitudinal extension in a wind direction, comprising:

a cooling device extending from the top face of the nacelle, and a cover having at least one inner face, the cooling device being enclosed by the top face of the nacelle and the inner face of the cover, wherein at least one part of the cooling device is movable in relation to another part of the cooling device, the cover, or the top face of the nacelle, wherein the movable part is a door or a hatch pivotably connected to the cooling device or the cover.

12. A wind turbine nacelle having a top face with a longitudinal extension in a wind direction, comprising:

a cooling device extending from the top face of the nacelle, and a cover having at least one inner face, the cooling device being enclosed by the top face of the nacelle and the inner face of the cover, wherein at least one part of the cooling device is movable in relation to another part of the cooling device, the cover, or the top face of the nacelle, wherein the cooling device is connected with another part of the cooling device, the cover, or the top face of the nacelle in at least one connection having a damper using hydraulic, pneumatic, or rubber, or a spring to control the movement of the cooling device.

13. A wind turbine nacelle having a top face with a longitudinal extension in a wind direction, comprising:

a cooling device extending from the top face of the nacelle, and a cover having at least one inner face, the cooling device being enclosed by the top face of the nacelle and the inner face of the cover, wherein at least one part of the cooling device is movable in relation to another part of the cooling device, the cover, or the top face of the nacelle, wherein at least one part of the cover is movable in relation to another part of the cover, the cooling device, or the top face of the nacelle.

14. The wind turbine nacelle according to claim 13, wherein the movable part of the cover is a hatch in the top of the cover.

15. The wind turbine nacelle according to claim 13, wherein the entire cover is movable, the entire cover thus constituting the movable part of the cover, the cover being pivotably connected to the nacelle.

16. A wind turbine nacelle having a top face with a longitudinal extension in a wind direction, comprising:

a cooling device extending from the top face of the nacelle, and a cover having at least one inner face, the cooling device being enclosed by the top face of the nacelle and the inner face of the cover, wherein at least one part of the cooling device is movable in relation to another part of the cooling device, the cover, or the top face of the nacelle, further comprising a plurality of cooling devices arranged with a mutual distance, and the distance between two cooling device is between 20 and 200 mm, wherein a hinge connection is arranged between at least two cooling devices.

17. The wind turbine nacelle according to claim 16, wherein the hinge connection is arranged at a top and at a bottom of the cooling devices.

18. The wind turbine nacelle according to claim 16, wherein the hinge connection comprises at least two corrugated metal pipes, the corrugated metal pipes being connected to and extending between the cooling devices, and the corrugated metal pipes preferably being made of stainless steel.

* * * * *